United States Patent
Mapkar et al.

(10) Patent No.: US 12,139,606 B2
(45) Date of Patent: Nov. 12, 2024

(54) HIGH TOUGHNESS ELECTRICALLY CONDUCTIVE PEEK FOR AIRCRAFT FUEL SYSTEM

(71) Applicant: Eaton Intelligent Power Limited, Dublin (IE)

(72) Inventors: Javed Abdurrazzaq Mapkar, Northville, MI (US); Namrata Salunke, San Jose, CA (US); Michael J. DeMuth, Thornton, CO (US)

(73) Assignee: Eaton Intelligent Power Limited, Dublin (IE)

( * ) Notice: Subject to any disclaimer, the term of this patent is extended or adjusted under 35 U.S.C. 154(b) by 148 days.

(21) Appl. No.: 17/713,882

(22) Filed: Apr. 5, 2022

(65) Prior Publication Data

US 2022/0325100 A1 Oct. 13, 2022

Related U.S. Application Data

(60) Provisional application No. 63/171,912, filed on Apr. 7, 2021.

(51) Int. Cl.
*C08L 71/02* (2006.01)
*B64D 37/14* (2006.01)
*B64D 37/32* (2006.01)

(52) U.S. Cl.
CPC .............. *C08L 71/02* (2013.01); *B64D 37/14* (2013.01); *B64D 37/32* (2013.01)

(58) Field of Classification Search
CPC .......... C08L 71/02; B64D 37/14; B64D 37/32
USPC ....................................................... 525/165
See application file for complete search history.

(56) References Cited

U.S. PATENT DOCUMENTS

| | | |
|---|---|---|
| 5,106,540 A | 4/1992 | Barma et al. |
| 10,435,539 B2 | 10/2019 | Mapkar et al. |
| 2004/0232389 A1* | 11/2004 | Elkovitch .............. B82Y 10/00 252/500 |
| 2011/0260116 A1 | 10/2011 | Plee et al. |
| 2013/0202832 A1 | 8/2013 | Kwan et al. |
| 2013/0206273 A1 | 8/2013 | Guest et al. |
| 2014/0091253 A1 | 4/2014 | Myllymaki et al. |
| 2016/0090469 A1 | 3/2016 | Mapkar et al. |

FOREIGN PATENT DOCUMENTS

| | | |
|---|---|---|
| CN | 102321338 A | 1/2012 |
| CN | 102977549 A | 3/2013 |
| CN | 103013090 A | 4/2013 |

(Continued)

OTHER PUBLICATIONS

Sato et al., JP 2018-004719 A machine translation in English, Jan. 11, 2018/ (Year: 2018).*

(Continued)

*Primary Examiner* — David T Karst
(74) *Attorney, Agent, or Firm* — Merchant & Gould P.C.

(57) ABSTRACT

The disclosure provides composite polymer compositions comprising a polyaryl ether ketone base polymer, a conductive filler, a dispersing and processing additive, and optionally a dielectric filler. The composite polymers exhibit retained or improved strength, increased toughness, and significantly increased elongation at break compared to the base polymer. The composite polymer may be used in lightweight, non-metallic fuel conveyance systems in aircraft.

18 Claims, 11 Drawing Sheets

(56) References Cited

FOREIGN PATENT DOCUMENTS

| CN | 109627679 A | 4/2019 | |
|---|---|---|---|
| CN | 110591283 A | 12/2019 | |
| CN | 110591329 A | 12/2019 | |
| FR | 2940659 A1 | 7/2010 | |
| JP | 2018004719 A | * 1/2018 | ............. C03G 15/16 |
| JP | 2020-66723 A | 4/2020 | |
| WO | 2014/186460 A1 | 11/2014 | |

OTHER PUBLICATIONS

Victrex, https://www.victrex.com/en/downloads/datasheets/victrex-peek-450g, accessed Jan. 11, 2024. (Year: 2024).*

Zhang et al., CN 109627679 A machine translation in English, Apr. 16, 2019. (Year: 2019).*

Abdelkarim et al.,. "Effect of Nano Fillers on Electrical Performance of Epoxy Composite Insulators," International Journal of Engineering and Technical Research (IJETR). ISSN: 2321-0869, vol. 2, Issue 7, pp. 60-65 (Jul. 2014).

Octalsobutyl POSS Hybrid Plastic—MS0825 Catalog, 1 page (Downloaded 2021).

RTP 2299 X 115090 L Polyetheretherketone (PEEK) Product Data Sheet & General Processing Conditions, RTP Company, 7 pages (May 21, 2007).

RTP 2299 X 115090 M Polyetheretherketone (PEEK) Product Data Sheet & General Processing Conditions, RTP Company, 2 pages (May 21, 2007).

RTP 2299 X 115092 A Polyetheretherketone (PEEK) Product Data Sheet & General Processing Conditions, RTP Company, 2 pages (Jan. 2, 2008).

SO1458—TriSilanolPhenyl POSS Hybrid Plastics, Hybrid Plastics, Inc., 1 page (Downloaded 2021).

TECAPEEK ELS nano black—Stock Shapes (rods, plates, tubes), Ensinger GmbH, 1 page (Feb. 20, 2018).

TriSilanolIsobutyl POSS Hybrid Plastic—S01450 Catalog, www.hybridplastics.com, 1 page (Downloaded 2021).

Vestakeep® 5000G Product Information, Evonik Industries AG, 2 pages (Oct. 2011).

Victrex® PEEK 150G / 151G, Victrex plc, 2 pages (Jul. 2017).

Victrex® PEEK 381G, Victrex plc, 2 pages (Jul. 2017).

Victrex® PEEK 650G, Victrex plc, 2 pages (Jul. 2018).

Victrex™ PEEK 450G™, Victrex plc, 2 pages (Nov. 2019).

French Search Report for FR2203097, dated Nov. 16, 2023, 9 pgs.

Kugarajah et al., "Sulphonated polyhedral oligomeric silsesquioxane/ sulphonated poly ether ether ketone nanocomposite membranes for microbial fuel cell: Insights to the miniatures involved," Chemosphere, vol. 260, pp. 1-13 (2020).

Chinese Office Action and Search Report for Application No. 202210362319.3 mailed Sep. 27, 2023 (with English Translation).

* cited by examiner

HIGH TOUGHNESS ELECTRICALLY CONDUCTIVE PEEK FOR AIRCRAFT FUEL SYSTEM

CROSS-REFERENCE TO RELATED APPLICATION

This application claims priority to U.S. Provisional Application No. 63/171,912, filed on Apr. 7, 2021, the contents of which are incorporated by reference herewith in their entirety.

BACKGROUND OF THE INVENTION

Demand for increased fuel efficiency in the aerospace industry has led to tremendous development in the field of polymer composites to reduce weight while maintaining structural integrity of aircraft and aircraft parts used in fuselage, wings and in-cabin applications. To further reduce the weight of the aircraft and simplify its architecture it is essential to also introduce composites in the fuel conveyance system, for example, including fuel tubes, reducers, flanges, brackets etc. For successful use of polymer composites in aerospace fuel system, the material needs to have tailored electrical conductivity to meet electrostatic discharge (ESD) specification and lightning strike protection in compliance with Radio Technical Commission for Aeronautics (RTCA) DO-160 (environmental) standards. Additionally, high strength, ductility and toughness are necessary for the material to meet the structural load requirements and to withstand the rigor of post processing steps such thermal bending and handling during manufacturing, assembly and use.

Historically, to develop electrically conductive polymer with ESD properties, fillers like carbon black, graphite and carbon fiber are used. This range of electrical resistance, $10^5$ to $10^8$ ohms typically requires >10 wt % of fillers. At this high loading of fillers, the polymers turn brittle and stiff, making them unsuitable for applications like fuel tubes because they require post processing like bending and thermoforming.

High temperature polymers like PEEK have good tensile properties, chemical resistance, thermal stability, and have relatively high ductility with elongation at break of typically between 25% to 45%, theoretically making them suitable for replacing aluminum metallic fuel tubes.

Commercially available PEEK-carbon nanotube (CNT) composite polymers in the market have the right electrical resistance for ESD discharge, but the unfortunately the elongation break may be only between 2% and 5% and hence these materials may not be suitable for fuel tube application.

U.S. Pat. No. 10,435,539, Mapkar et al., describe a solid polymer composite material, for example, comprising a polyamide or a polyetherether ketone, a carbon nanotube, and a spherical nanodiamond additive.

US 20130206273, Guest et al., describe a downhole composite component comprising a polymer matrix including a thermoset or thermoplastic polymer, a nanoparticle filler, and reinforcing fibers.

US 20140091253, Myllymaki et al., describe a nanodiamond containing thermoplastic thermal composite material including nanodiamonds, a thermoplastic polymer, and a filler such as a boron nitride filler.

An improved and economical conductive composite material with improved strength and toughness including tailored electrical conductivity for ESD and lightning strike protection required for a non-metallic fuel conveyance system is desirable.

SUMMARY

The present disclosure provides an economical conductive composite material prepared from a composition comprising a high temperature PEEK polymer, with improved strength and toughness as well as tailored electrical conductivity for ESD and lightning strike protection to meet or exceed electrostatic discharge (ESD) specification and lightning strike protection in compliance with Radio Technical Commission for Aeronautics (RTCA) DO-160 (environmental) standards when compared to the base PEEK polymer.

A solid polymer conductive composite material is provided comprising a polyaryl ether ketone (PAEK) polymer, a conductive filler, a dispersing and processing additive, and a dielectric filler. The PAEK polymer may be selected from the group consisting of a polyether ether ketone (PEEK) and a polyether ketone ketone (PEKK).

The base PEEK polymer may be a medium to high viscosity PEEK polymer. The base PEEK polymer may be unreinforced.

The conductive filler may be selected from the group consisting of carbon nanotubes, graphene, graphene oxide, carbon nanofibers, and carbon nanostructures. The dispersing and processing additive may be selected from polyhedral oligomeric silsesquioxanes (POSS), silanes, and silanol-POSS. The dielectric filler may be selected from the group consisting of nano alumina, nano silica, fumed alumina, fumed silica, ZnO, and $TiO_2$. In some embodiments, the conductive composite material does not include a nanodiamond filler.

The solid polymer composite material may comprise from about 90 wt % to about 99 wt % of a polyether ether ketone (PEEK) base polymer.

The solid polymer composite material may comprise from about 0.25 wt % to about 5 wt % of the electrically conductive filler.

The solid polymer composite material may comprise from about 0.25 wt % to about 5 wt %, of the dispersing and processing additives.

The solid polymer composite material may comprise from about 0.05 wt % to about 3 wt % of the dielectric filler.

The solid polymer composite material according to the disclosure may exhibit one or more of tensile strength at room temperature (73° F.) of at least 80 MPa; elongation at break of at least 20%; electrical resistance between $10^5\Omega$ and $10^8\Omega$; maximum tensile strength of at least 95 MPa or greater; modulus of toughness of at least 15 MPa or greater; and impact strength, Izod, notched, of at least 60 KJ/m2 or greater.

A non-metallic fuel conveyance system part for an aircraft may be prepared from the conductive composite material according to the disclosure. The aircraft part may be a fuel tube, hose, coupling, clamp, ducting, reducer, flange, ferrule, bracket, and housing. A non-metallic fuel tube is provided comprising at least one layer prepared from the conductive composite composition according to the disclosure. A non-metallic fuel tube is provided comprising at a single layer prepared from the conductive composite composition according to the disclosure. The fuel tube may exhibit electrical resistance between 100 K$\Omega$ and 100M$\Omega$/15"; maximum operating pressure of at least a 120 psi; continuous operating temperature of from −65° F. or below to at least 275° F.; an excursion operating temperature of at least 325° F.; and be in compliance with RTCA DO-160 environmental standards.

A solid polymer conductive composite material is provided that is prepared from a composition comprising 90-99 wt % of a PEEK polymer; 0.25-5.0 wt % of a conductive filler; 0-3 wt % of a dielectric filler; and 0.25-5.0 wt % of a dispersing and processing additive. The solid polymer conductive composite material may be prepared from a composition comprising 95-98.5 wt % of a PEEK polymer; 0.5-3.0 wt % of a conductive filler; 0.5-2 wt % of a dielectric filler; and 0.5-3.0 wt % of a dispersing and processing additive. The solid polymer conductive composite material may be prepared from a composition comprising 95-98.5 wt % of a PEEK polymer; 0.5-3.0 wt % of carbon nanotubes; 0.5-2 wt of a fumed silica; and 0.5-3.0 wt % of POSS. A solid polymer conductive composite material is provided that is prepared from a composition comprising 96-98.5 wt % of a PEEK polymer; 0.5-2.0 wt % of a conductive filler; 0.5-1.5 wt % of a dielectric filler; and 0.5-2.0 wt % of a dispersing and processing additive. In some embodiments, the solid polymer conductive composite material comprises a total amount of combined fillers that does not exceed 5 wt %.

The conductive composite material may exhibit a tensile strength of 100 MPa or higher at room temperature at room temperature by ASTM D 638. The elongation at break may be 20% or higher, 30% or higher, 60% or higher, 70% or higher, 80% or higher, or 90% or higher when measured at room temperature by ASTM D638. The modulus of toughness as measured by area under tensile stress strain curve may be 18 MPa or higher. The maximum tensile strength may be 100 MPa or higher. The tensile strength at −65° F. may be 140 MPa or higher. The tensile strength at 73° F. may be 90 MPa or higher. The tensile strength at 275° F. may be 50 MPa or higher. The tensile modulus at −65° F. may be 4.5 GPa or higher. The tensile modulus at 73° F. may be 4.0 GPa or higher. The tensile modulus at 275° F. may be 3.5 GPa or higher. The impact strength (Izod, notched) at −65° F. may be 15 KJ/m2 or higher. The impact strength (Izod, notched) at 73° F. may be 16 KJ/m2 or higher. The impact strength (Izod, notched) at 275° F. may be 100 KJ/m2 or higher.

The composite polymer may be a conductive composite polymer. The conductive composite polymer may be prepared from a conductive composite composition.

In some embodiments, the conductive composite composition may include base PEEK polymer in an amount between 90 and 99 wt %, 95 and 99 wt %, or 96 and 98.5 wt %. In some embodiments, the conductive composite composition may include conductive filler in an amount between 0.5 and 5.0 wt %, 0.5 and 3 wt %, or 0.5 and 2 wt %. In some embodiments, the conductive composite composition may include dielectric filler in an amount between 0 and 3 wt %, 0 and 2 wt %, 0.5 and 2 wt %, or 0.5 and 1.5 wt %. In some embodiments, the conductive composite composition may include a dispersing and processing additive in an amount between 0.3 and 5.0 wt %, 0.5 and 3 wt %, or 0.5 and 2.0 wt. %.

In some embodiments, the conductive composite composition may include base PEEK polymer in 90-99 wt %, a conductive filler in 0.5-5.0 wt %, a dielectric filler in 0-3 wt %, and a dispersing and processing additive in 0.3-5.0 wt %.

In some embodiments, the conductive composite composition may include base PEEK polymer in 95-99 wt %, a conductive filler in 0.5-3 wt %, dielectric filler in 0.5-2 wt %, and a dispersing and processing additive in 0.5-3 wt %.

In some embodiments, the conductive composite composition may include base PEEK polymer in 96-98.5 wt %, a conductive filler in 0.5-2 wt %, a dielectric filler in 0.5-1.5 wt %, and a dispersing and processing additive in 0.5-2.0 wt %.

The composite polymer may exhibit tensile strength at room temperature (73° F.) of at least 80 MPa; at least 90 MPa, or at least 100 MPa.

The composite polymer may exhibit elongation at break of at least 20%, at least 30%, at least 40%, at least 50%, at least 60%, or at least 70%.

The composite polymer may be an ESD composite polymer having electrical resistance between 100 KΩ and 100MΩ/15".

The composite polymer may be an ESD composite polymer having electrical resistance between $10^5 \Omega$ and $10^8 \Omega$.

The composite polymer may exhibit maximum tensile strength of 95 MPa or greater, or 100 MPa or greater.

The composite polymer may exhibit modulus of toughness of at least 15 MPa, or at least 18 MPa.

The composite polymer may exhibit impact strength, Izod, notched, of at least 60 KJ/m2, at least 80 KJ/m2, or at least 100 KJ/m2 at 275° F.

DETAILED DESCRIPTION

The present disclosure provides composite compositions and polymer materials with tailored electrical conductivity for electrostatic discharge (ESD), while increasing the strength, toughness of the base PEEK (polyether ether ketone) polymer about 2-fold over the base PEEK polymer, and achieving an improved elongation at break of up to 60% to 120%, which may be about 2-fold to about 3-fold of the base PEEK. This allows design of fuel tube & other fuel system components that are tough, high impact strength, improved fatigue resistant and more resilient than commercially available ESD PEEK.

The terminology used herein is for the purpose of describing particular embodiments only and is not intended to be limiting of the disclosure.

The singular forms "a", "an" and "the" are intended to include the plural forms as well, unless the context clearly indicates otherwise. The term "and/or" refers to and encompasses any and all possible combinations of one or more of the associated listed items.

The term "about," when referring to a measurable value such as an amount of a compound, dose, time, temperature, and the like, is meant to encompass variations of 10%, 5%, 1%, 0.5%, or even 0.1% of the specified amount.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms used in the description, have the same meaning as commonly understood by one of ordinary skill in the art to which this disclosure belongs. In the event of conflicting terminology, the present specification is controlling.

All patents, patent applications and publications referred to herein are incorporated by reference in their entirety.

The embodiments described in one aspect of the present disclosure are not limited to the aspect described. The embodiments may also be applied to a different aspect of the disclosure as long as the embodiments do not prevent these aspects of the disclosure from operating for its intended purpose.

Unless otherwise specified, the term "room temperature" refers to about 73° F. (23° C.).

The disclosure provides tailorable nanocomposite polymers with ductility and toughness higher than base polymer alone, and imparting functional properties such as electrical conductivity and thermal conductivity. A synergistic behavior is found when different chemistries, the size and shape of nanofiller, and appropriate ratios are employed to enhance the properties of the nanocomposite that may not be apparent with addition of the individual nanofillers. Each filler material can impart unique properties to the composite and enhance its properties to make them useful for metal replacement in aerospace and automotive applications.

Figure 1:
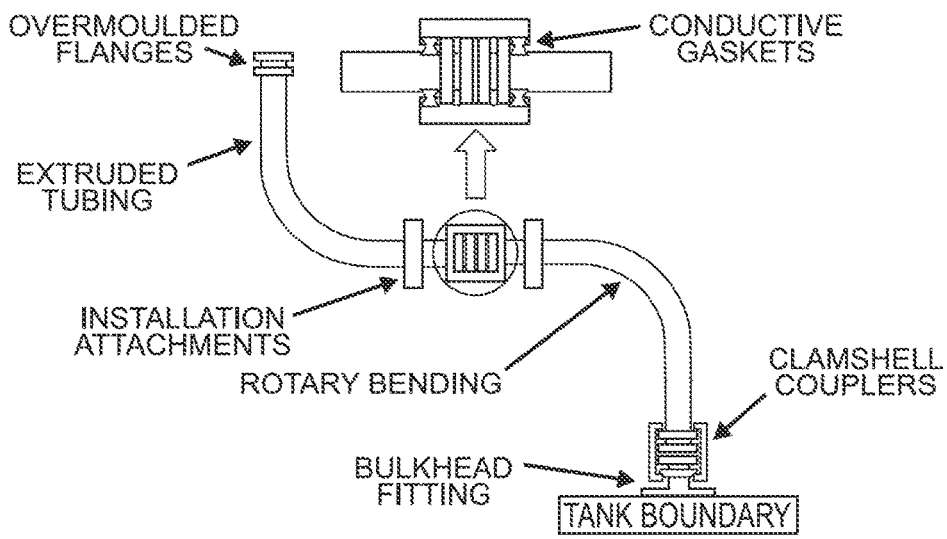
FIG. 1 shows a schematic drawing of an exemplary non-metallic fuel conveyance system.
Figure 2A:
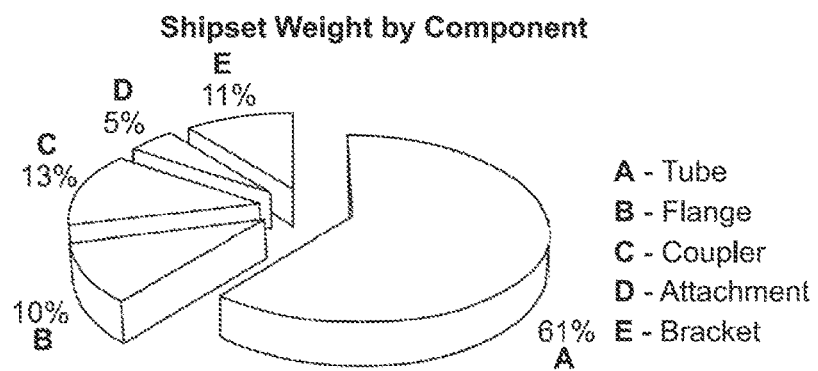
FIG. 2A shows a pie chart of fraction of weight reduction and associated fuel savings (overall 20%) based on a single aisle aircraft fuel conveyance system for parts prepared from inventive conductive composite materials replacing aluminum components including fuel tubes, flanges, couplers, attachments, and brackets.
Figure 2B:
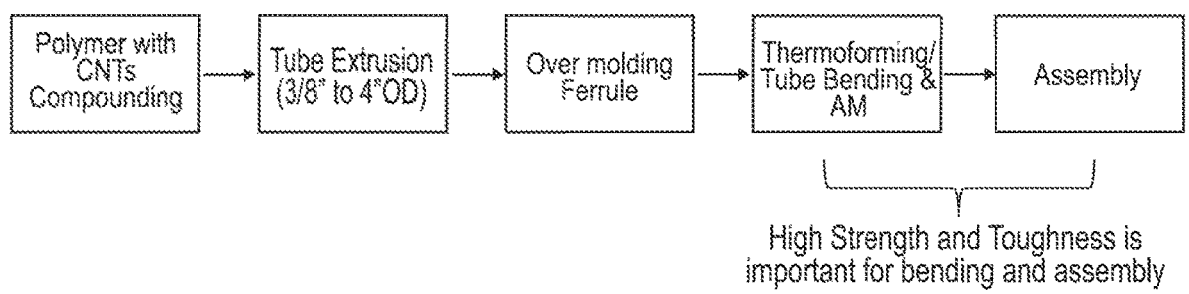
FIG. 2B shows an aircraft tube process map including compounding the PAEK composite polymer with carbon nanotube fillers, tube extrusion, over molding of ferrules, thermoforming/tube bending, and assembly. High strength and toughness is important for the bending and assembly steps.

A lightweight, non-metallic fuel conveyance system is provided which is electrostatic and lightning compatible, and exhibits higher strength and toughness compared to base polymer alone, or compared to commercially available PEEK-carbon nanotube materials. The fuel conveyance system may include tubing, flanges, fittings, couplers, attachments, brackets, ferrules, casings, and gaskets, for example, as shown in FIG. 1. The tubing may be fuel tubing. The tubing may include rotary bending. The tubing may be extruded tubing. The attachments may include installation attachments. The flanges may include overmoulded flanges. The gaskets may include conductive gaskets. The lightweight, non-metallic fuel conveyance system will result in weight reduction (~20%) and fuel savings, as well as a system level cost reduction, and maintain an installation strategy of bend tubes and flexible couplers. A weight reduction and associated fuel savings (overall 20/a) is projected based on a single aisle aircraft fuel conveyance system for parts prepared from inventive conductive composite materials replacing aluminum components including tubes, flanges, couplers, attachments, and brackets, as shown in FIG. 2A. Replacement of aircraft fuel conveyance system fuel tubes are projected to contribute to the greatest proportion of weight reduction. FIG. 2B shows an aircraft tube process map including compounding the PAEK composite polymer with carbon nanotube fillers, tube extrusion, over molding of ferrules, thermoforming/tube bending, and assembly. High strength and toughness is important for the bending and assembly steps.

Generally, the polymer composite may be prepared by providing a polyaryl ether ketone polymer, adding a conductive filler such as carbon nanotubes, one or more dispersing and processing fillers, and optionally a dielectric filler. The combinations described herein have produced a synergistic effect with regard to the structural properties of the non-metallic composite polymer.

The disclosure provides a conductive composite polymer comprising a base polymer, a conductive filler, a dielectric filler, and one or more dispersing and or processing fillers. In some embodiments, the conductive composite polymer does not contain a polyamide such as a nylon material.

The base polymer may be a thermoplastic polyaryl ether ketone polymer (PAEK). PAEK is a linear aromatic polyether ketone polymer. The PAEK polymer may be selected from the group consisting of a polyether ether ketone (PEEK) and a polyether ketone ketone (PEKK). The structures of PEEK and PEKK have aromatic rings which differ in the ration of ether- and keto-groups. PEKK has a second ketone group in its repeating structure.

PEEK polymers may be obtained by step-growth polymerization by the dialkylation of bisphenolate salts. It involves reaction of 4,4'-difluorobenzophenone or 1,4-bis(4-fluorobenzoyl) benzene with hydroquinone in the presence of alkali carbonates. The polymer is then isolated by removal of alkali metal fluoride and the polymerization solvent.

The PEEK polymer may be a commercially available PEEK polymer. The PEEK polymer may be selected from, for example, a Victrex PEEK such as VICTREX®, VICTREX™ PEEK™ (Victrex plc), Dow DuPont PEEK (Vespel), Quadrant PEEK (Ketron), a SABIC PEEK such as, for example, LNP™ THERMOCOMP™, LNP™ LUBRICOMP™, LNP™ STAT-KON™, Lehman & Voss PEEK such as, for example, LUVOCOM®, RTP Company PEEK such as, for example, RTP 2200 Series; Solvay PEEKs such as, for example, KeTaSpire®, Solviva®, Zeniva®, Tribocomp®, and Evonik PEEKs such as, for example, VESTAKEEP® PEEKs. The PEEK polymer may be an unreinforced PEEK polymer. The PEEK maybe semi-crystalline. The PEEK may be in the form of granules. The PEEK polymer may have a melt viscosity at 400° C. of between about 130 Pa·s and about 500 Pa·s. The PEEK polymer may have a medium to high melt viscosity of between about 300 Pa·s and about 500 Pa·s under ISO 11443. The melt viscosity may be measured as $[1000\ s^{-1}]$/Pa·s. In some embodiments, the base PEEK is not blended with a polyamide such as a nylon material. In some embodiments, the base PEEK polymer is unreinforced. In some embodiments, the base PEEK polymer may be semi crystalline.

PEEK may be processed by conventional methods such as injection molding, extrusion, compression molding, etc. However, the processing conditions used to mold PEEK can influence the crystallinity, and hence the mechanical properties. As a linear thermoplastic, polyether ether ketone can be melt processed in the temperature range of about 370 to about 420° C. While processing polyether ether ketone, no corrosive gases are evolved. The base polymer may be present in the composition in an amount within a range of from about 90 wt % to about 99 wt %, about 95 wt % to about 99 wt %, or about 96 wt % to about 98.5 wt %.

The conductive filler may be an electrically conductive filler. The conductive filler may be an electrically conductive and thermally conductive filler. The conductive filler may be selected from the group consisting of a carbon nanotubes, graphene, graphene oxide, carbon nanofibers, and other carbon nanostructures. The graphene oxide may be reduced graphene oxide. Carbon nanotubes may increase mechanical properties, such as stiffness and strength, electrical conductivity, and thermal conductivity. Platelet nano-additives, such as graphene may affect stiffness and strength, barrier properties, and may impart electrical and thermal conductivity. In a specific embodiment, the conductive filler is carbon nanotubes.

The electrically conductive fillers may be present in the composition in an amount within a range of from about 0.25 wt % to about 5 wt %, about 0.5 wt % to about 4 wt %, about 0.5 wt % about 3 wt %, or about 0.5 to about 2 wt %, or about 1 wt % to about 2 wt %, or <5 wt %, <4 wt %, <3 wt %, or <2 wt %. The lower loading may help retain the base polymer properties.

The dielectric filler may be selected from the group consisting of a fumed silica, fumed alumina, nano alumina, nano silica, boron nitride platelets, boron nitride nanoflakes, boron nitride nanotubes, ZnO, and $TiO_2$. In a specific embodiment, the dielectric filler is a fumed silica. Nano alumina fillers may be used to improve dielectric permittivity, direct current (DC) volume resistivity, and DC breakdown strength of the composite polymer. The dielectric filler may be present in the conductive composite composition in an amount between about 0 wt % and about 3 wt %, 0.05 and about 3 wt %, 0.1 wt % a 2 wt %, or about 0.5 wt % to about 1.5 wt % of the composition.

The dispersing and processing additives may be selected from the group consisting of polyhedral oligomeric silsesquioxanes (POSS), silanes, and silanol-POSS. The dispersing additive may be used to improve the dispersion of the additives throughout the polymer matrix. For example, polyhedral oligomeric silsesquioxane (POSS) may be used by itself as an additive, e.g. Octalsobutyl POSS, TriSilanolPhenyl POSS, TriSilanolIsobutyl POSS, or as a flow or dispersion additive (e.g. silanol-POSS). The POSS compounds may be purchased commercially, for example, from Hybrid Plastics. In a specific composition, the dispersing and processing additive is POSS. The dispersing and processing additives may be present in the composition in an amount within the range of from about 0.1 wt % to about 5 wt %, about 0.3 to about 5.0 wt %, about 0.5 wt % to about 3 wt %, and about 0.5 to about 2.0 wt %.

In some embodiments, the above combined conductive and dielectric fillers can be used in range of 0.1 wt % to 5 wt % in combination while keeping the overall weight percentage of fillers <5 wt %, <4 wt %, or <3 wt % to achieve the enhancement in properties.

The enhancement in properties achieved with the inventive nanocomposite polymer over the base polymer may include an increase in tensile strength of at least about 1.1×, or from between about 1.1× to about 1.25×; an increase in toughness of at least about 1.5×, or from between about 1.5× to about 3×; an increase in impact strength of at least about 1.5×, or from between about 1.5× to about 3×; and an increase in elongation to break of at least about 1.5×, or from between about 1.5× to about 3.5×.

The electrically conductive composite polymers may be processed, for example, by injection molding or extrusion processes. The inventive composite polymer materials exhibit comparable or higher strength and higher toughness than comparative base PEEK materials or comparative commercially available PEEK carbon nanotube composite materials tested. The inventive composite polymers retain the base PEEK polymer's ductility and does not become brittle like the commercially available PEEK CNT polymers. The inventive composite polymers are easy to post process, for example, by tube bending, machining, and the like, without the issue of fracture due to brittleness typically seen with several commercially available PEEK-CNT composites.

A lightweight, non-metallic fuel tube is provided comprising at least one layer prepared from a composition of the disclosure. The non-metallic tube may exhibit a controlled electrical resistance between 100 KΩ~100MΩ/15", a 120 psi operating pressure at from −65° F. to 275° F. continuous, and up to 325° F. excursion. The non-metallic tube is in compliance with Radio Technical Commission for Aeronautics (RTCA) DO-160 (environmental) standards. The electrical resistance may be measured as a surface resistance.

In the present disclosure, the tensile strength, tensile modulus, and elongation at break are measured using ASTM D638 standard or ISO 527, for example, using Instron 3369. Toughness is measured as the area under the stress-strain curve, impact strength is determined by ASTM D 256, Izod notched impact was measured using Ceast 9000. Thermal Conductivity may be measured using TPS 2500 instrument. Surface resistivity, volume resistivity may be measured under ASTM D257, IEC 62631-3-1, electrical conductivity was measured according to ASTM D257 and D4496, and thermal conductivity was measured using a hot plate transient source method with a ThermTest TPS2500. Tensile fatigue may be measured under ASTM D3479 standard test method for tension-tension fatigue of polymer matrix materials.

Compositions

The inventive conductive composite polymer may be prepared from a composition according to Table 1.

TABLE 1

Inventive Compositions

| Component | Formula 1 | Formula 2 | Formula 3 |
|---|---|---|---|
| Base polymer | 90-99 wt % | 95-98.9 wt % | 96-98.5 wt % |
| Conductive filler | 0.25-5.0 wt % | 0.5-3 wt % | 0.5-2.0 wt % |
| Dielectric filler | 0-3.0 wt % | 0.1-2 wt % | 0.25-1.5 wt % |
| Dispersing and processing additive | 0.25-5.0 wt % | 0.5-3 wt % | 0.5-2.0 wt % |

EXAMPLES

Example 1

Six comparative samples and three inventive samples were prepared. A first comparative base PEEK 1 sample was prepared using a commercially available Victrex PEEK 450G. A second comparative base PEEK 2 sample was prepared using a commercially available Evonik PEEK 5000G. Four comparative PEEK composite CNT samples were prepared from: RTP 2299 X 115090 L PEEK (RTP Plastics, Winona, MN) which is a PEEK comprising carbon nanotubes with ESD protection; RTP 2299 X 115090 M which is a PEEK comprising carbon nanotubes with ESD protection; RTP 2299 X 115092 A which is a PEEK comprising carbon nanotubes with ESD protection; and TECAPEEK ELS nano black (Ensinger) which includes VICTREX PEEK 450 G polymer and carbon nano tubes. Inventive sample compositions are shown in Table 2.

TABLE 2

Inventive Conductive Composite Polymer Compositions

| | ESD PEEK 1 | | ESD PEEK 2 (Formulation 1) | | ESD PEEK 2 (Formulation 2) | |
|---|---|---|---|---|---|---|
| | Component | Wt % | Component | Wt % | Component | Wt % |
| Base polymer | Victrex PEEK 450 G | 97.75 | Evonik PEEK 5000G | 97.75 | Evonik PEEK 5000G | 97.00 |
| Conductive Filler | Carbon nanotubes | 1.25 | Carbon nanotubes | 1.25 | Carbon nanotubes | 1.00 |
| Dielectric Filler | Fumed silica | — | Fumed silica | — | Fumed silica | 1.00 |
| Dispersing and processing additive | Polyhyderal Oligomeric Silsesquioxane (POSS) | 1.00 | POSS | 1.00 | POSS | 1.00 |

The samples were prepared by first drying the additives and the polymer to remove residual moisture and dry blending the components to form a uniform mixture. The mixture was fed in to a hopper of a twin screw extruder with the temperature of about 380° C. to about 425° C. and a screw speed of about between 100 rpm to 800 rpm.

The molten strands of the polymer composite were then quenched in water and pelletized to 1 mm to 3 mm composite pellets. To make coupons and tubes for testing, the pellets were dried and then injection molded into various shapes and sizes, or extruded. The tensile properties of the resulting samples were measured according to ASTM D638, impact properties were measured according to ASTM D256, electrical conductivity was measured according to ASTM 0257 and D4496, and thermal conductivity was measured using a bot plate transient source method with a ThermTest TPS2500.

Tensile Strength

Figure 3:
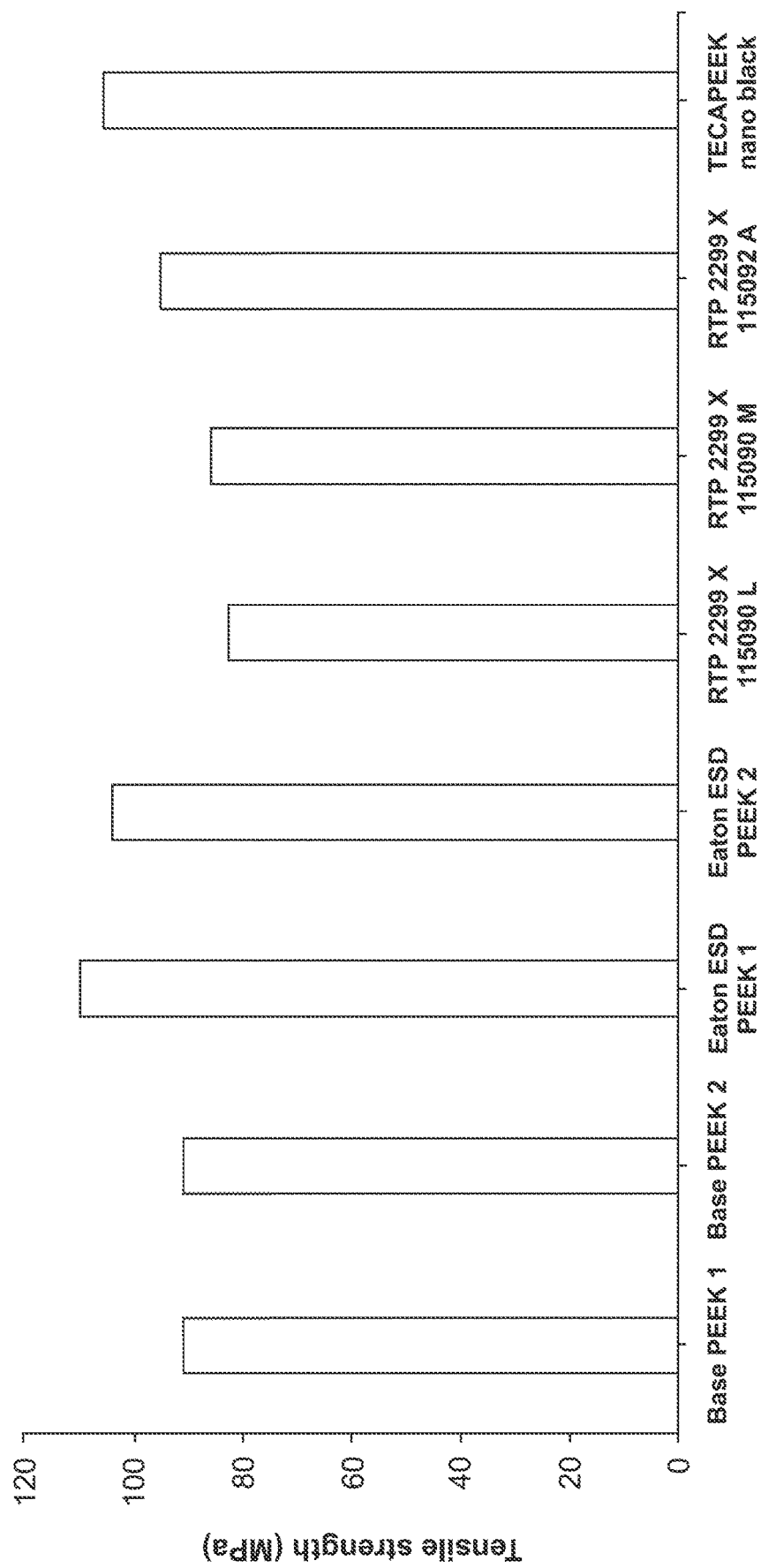
FIG. 3 shows a bar graph of tensile strength (MPa) at room temperature for, from left to right, comparative base PEEK 1, comparative base PEEK 2, inventive PEEK 1 composite polymer sample, inventive PEEK 2 composite polymer sample, and four comparative commercial PEEK CNT samples. Both inventive samples and one commercial PEEK with conductive CNT sample exhibited tensile strength of >100 MPa at room temperature by ASTM D 638.

Tensile strength was measured using ASTM D638 standard using Instron 3369. Samples of comparative base PEEK 1 (Victrex PEEK 450G), comparative base PEEK 2 (Evonik PEEK 5000G), inventive PEEK 1 composite polymer sample, inventive PEEK 2 composite polymer sample, and four comparative commercial PEEK CNT samples were prepared and tested under ASTM D638 for tensile strength (MPa) at room temperature. FIG. 3 shows a bar graph of tensile strength (MPa) data at room temperature for comparative base PEEK 1, comparative base PEEK 2, inventive PEEK 1 composite polymer sample, inventive PEEK 2 composite polymer sample, and four comparative commercial PEEK CNT samples. The inventive composite polymer samples exhibited somewhat higher tensile strength than the comparative base PEEK samples. The inventive composite polymer samples exhibited comparable or somewhat higher tensile strength than the comparative commercial PEEK CNT samples. Both of the inventive samples and one commercial PEEK with conductive CNT sample exhibited tensile strength of >100 MPa at room temperature by ASTM D 638. The tensile strength may be 100 MPa or higher.

Elongation at Break

Figure 4:
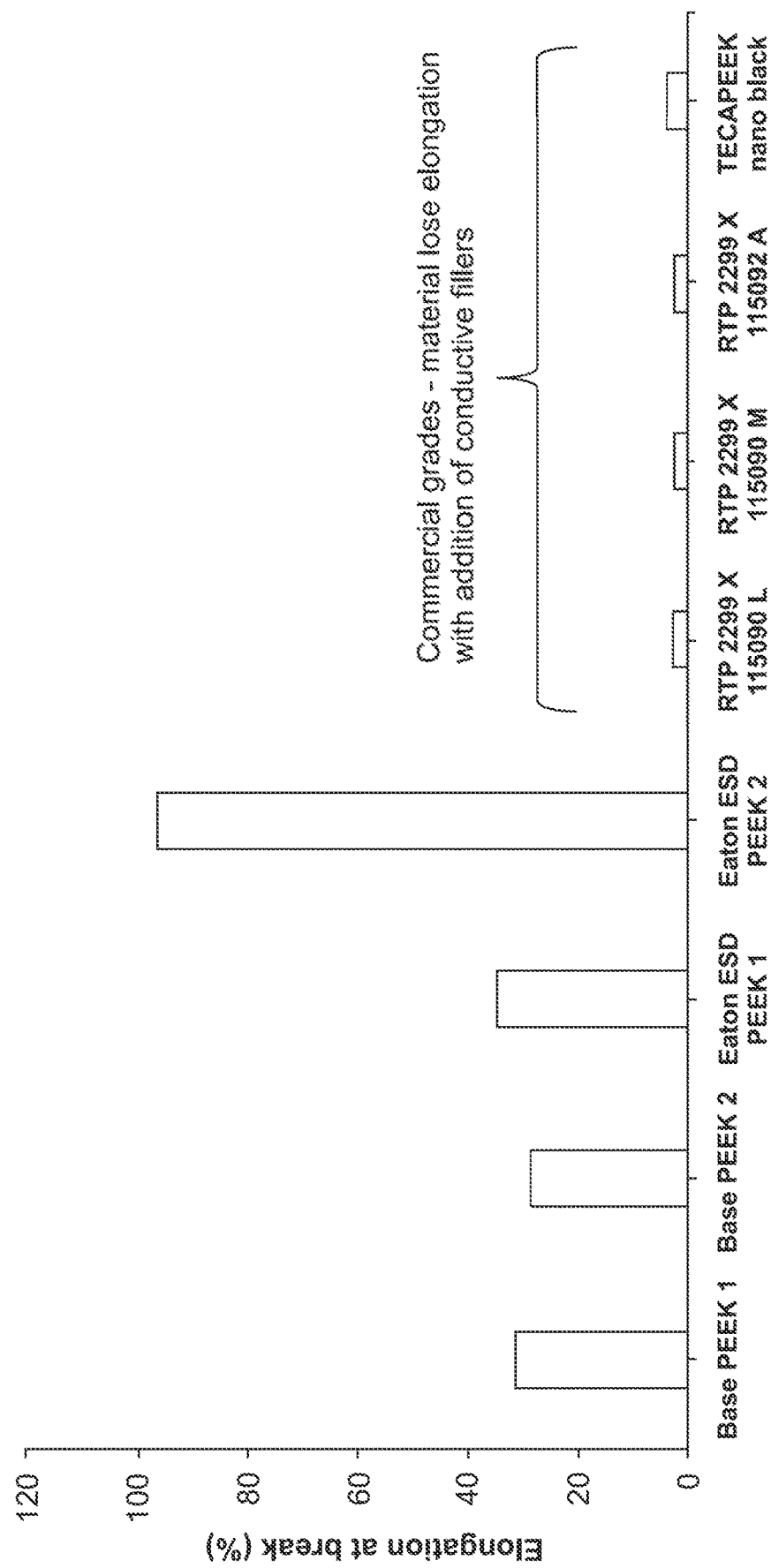
FIG. 4 shows a bar graph of elongation at break (%) at room temperature for, from left to right, comparative base PEEK 1, comparative base PEEK 2, inventive PEEK composite polymer sample, inventive PEEK 2 composite polymer sample, and four comparative commercial PEEK CNT samples. Elongation at break was >20% for each of base PEEK 1 and base PEEK 2 samples. Elongation at break was >30% for inventive PEEK 1 composite polymer sample, and >80% for inventive PEEK 2 composite polymer sample. However, all four commercial samples of PEEK with conductive CNT filler exhibited <4% elongation at break.

Elongation was measured using ASTM D638 standard using Instron 3369. Samples of comparative base PEEK 1 (Victrex PEEK), comparative base PEEK 2 (Evonik PEEK), inventive PEEK 1 composite polymer sample, inventive PEEK 2 composite polymer sample, and four comparative commercial PEEK CNT samples were prepared and tested under ASTM D638 for elongation at break (%) at room temperature. FIG. 4 shows a bar graph of elongation at break (%) at room temperature. Elongation at break was >20% for each of comparative base PEEK 1 and base PEEK 2 samples. Elongation at break was >30% for inventive PEEK 1 composite polymer sample, and >80% for inventive PEEK 2 composite polymer sample. However, all four commercial samples of PEEK with conductive CNT filler exhibited <4% elongation at break.

Toughness

Figure 5:
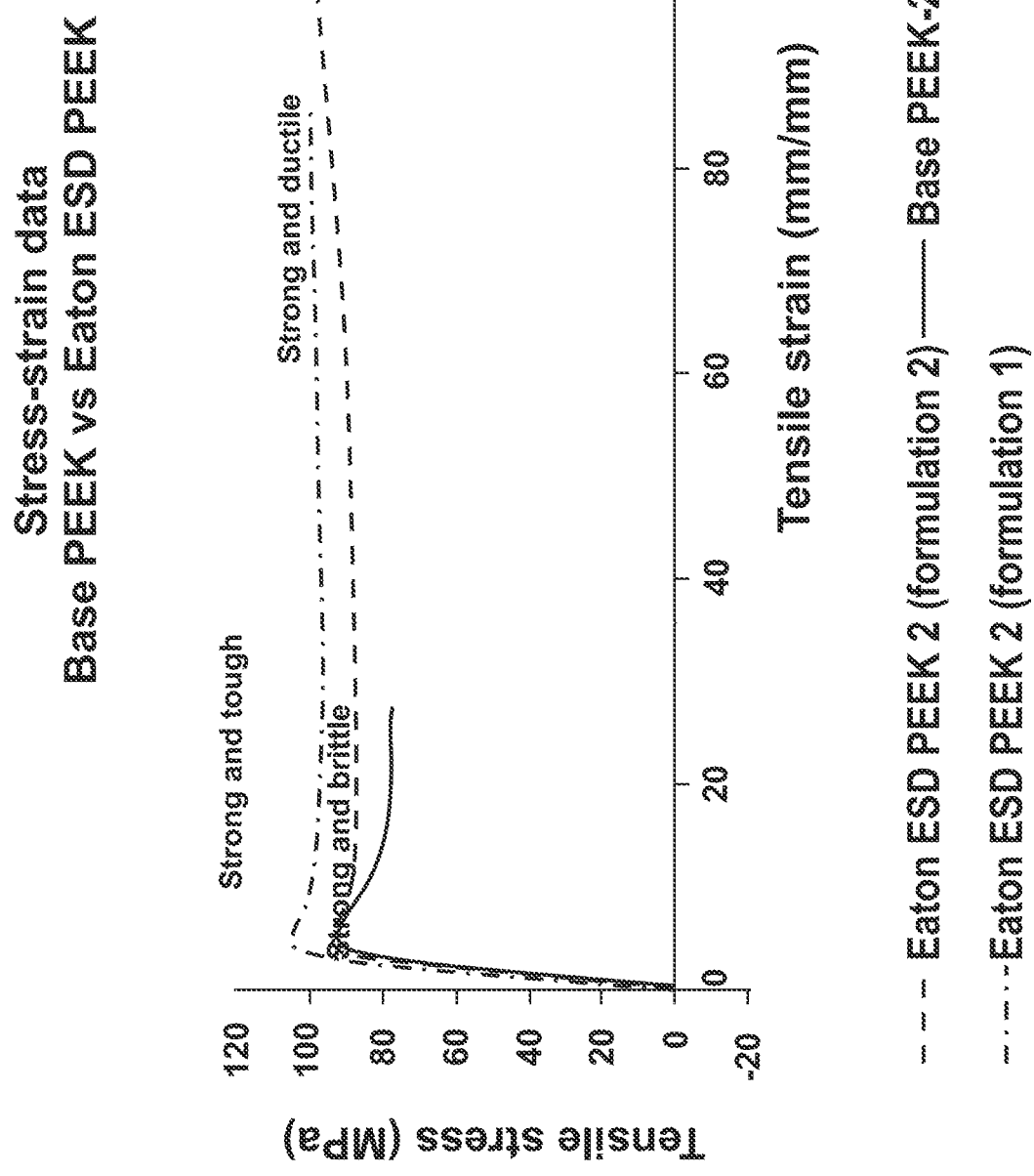
FIG. 5 shows a graph of stress-strain data for two different formulations of inventive PEEK 2 composite polymer samples and comparative PEEK 2 sample. Tensile stress (MPa) was plotted v tensile strain (mm/mm) to obtain the stress strain curves. Inventive PEEK 2 composite polymer formulation 2 sample exhibited a stress-strain curve indicating the sample is strong and ductile, and inventive PEEK 2 composite polymer formulation 1 sample exhibited a stress-strain curve indicating sample is strong and tough, while comparative base PEEK 2 sample exhibited a stress-strain curve indicating sample is strong and brittle.

Toughness was calculated as area under the tensile stress-tensile strain curve. FIG. 5 shows a graph of stress-strain data for two different formulations of inventive PEEK 2 composite polymer formulation samples and comparative PEEK 2 sample. Tensile stress (MPa) was plotted v tensile strain (mm/mm) to obtain the stress strain curves.

Inventive PEEK 2 composite polymer formulation 2 sample exhibited a stress-strain curve indicating the sample is strong and ductile, and inventive PEEK 2 composite polymer formulation 1 sample exhibited a stress-strain curve indicating sample is strong and tough, while comparative base PEEK 2 sample exhibited a stress-strain curve indicating sample is strong and brittle.

Figure 7:
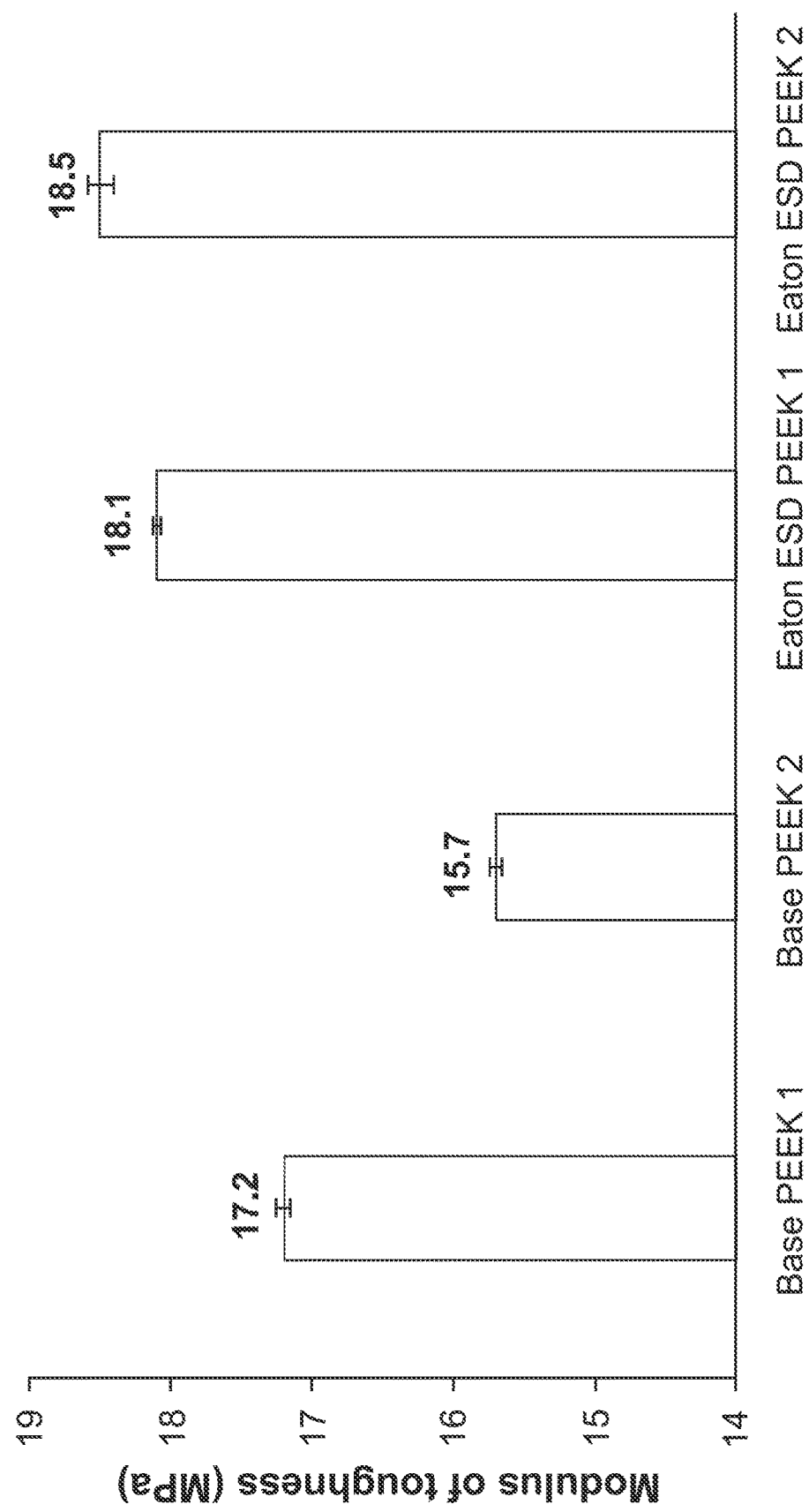
FIG. 7 shows a bar graph of the modulus of toughness (MPa) for comparative base PEEK 1 and base PEEK 2 samples, inventive PEEK 1 composite polymer and inventive PEEK 2 composite polymer samples. The inventive composite polymer samples exhibited increased toughness compared to PEEK 1 and PEEK 2 comparative samples.

FIG. 7 shows a bar graph of the modulus of toughness (MPa) for comparative base PEEK 1 and base PEEK 2 samples, inventive PEEK 1 formulation sample and inventive PEEK 2 formulation sample. The inventive samples exhibited increased toughness compared to base PEEK 1 and base PEEK 2 comparative samples. The modulus of toughness may be 18 MPa or higher, as shown in FIG. 7.

Mechanical Properties

Figure 6:
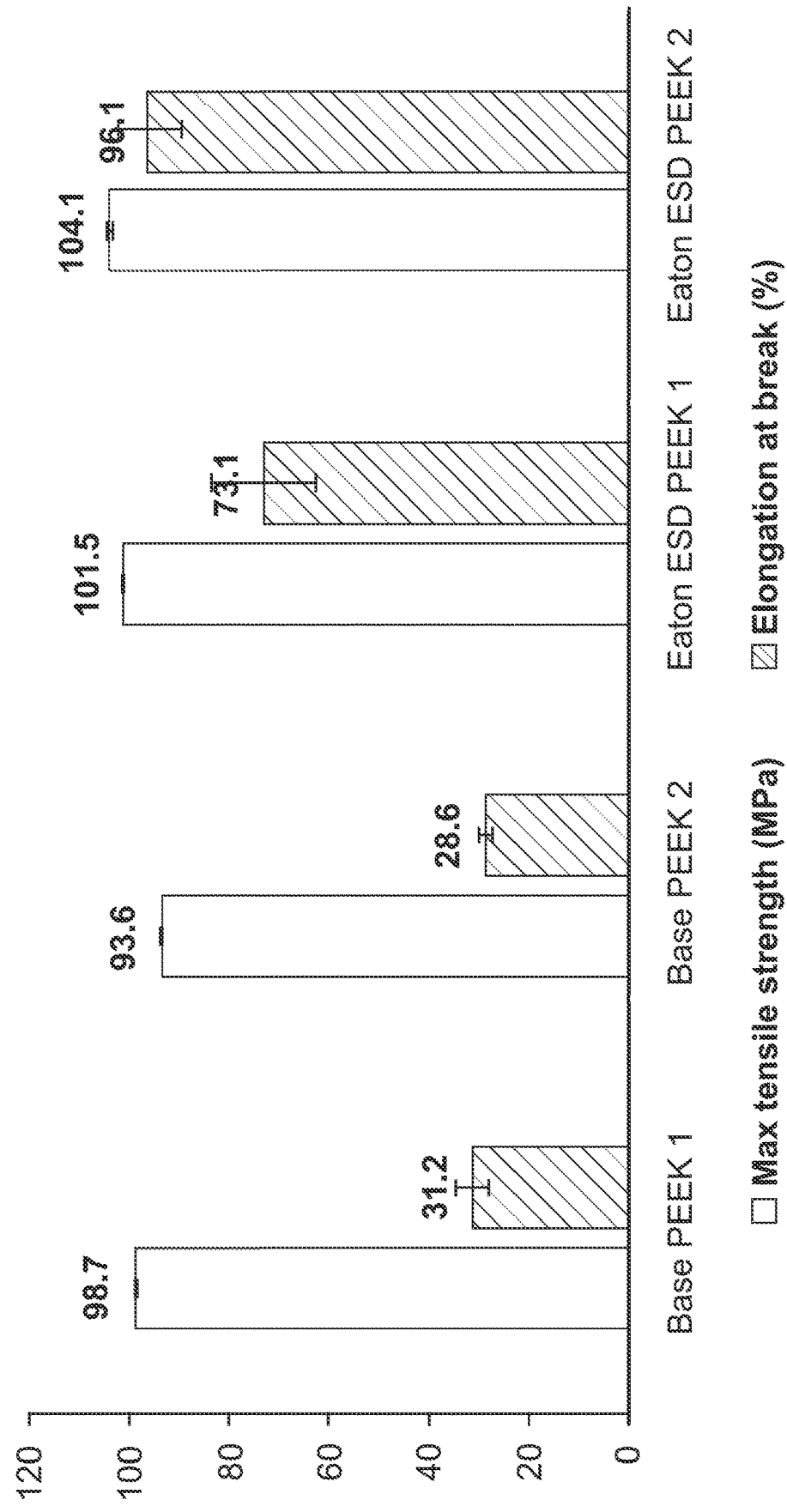
FIG. 6 shows a bar graph of mechanical properties including max tensile strength (MPa) and elongation at break (%) for comparative base PEEK 1, comparative base PEEK 2, inventive PEEK 1 composite polymer, and inventive PEEK 2 composite polymer samples. The inventive samples exhibited similar or slightly greater max tensile strength (101.5 MPa, 104.1 MPa, respectively) than the comparative base PEEK 1 (98.7 MPa) and comparative base PEEK 2 (93.6 MPa) samples. The inventive composite polymer samples exhibited significantly higher, greater than 2-fold or greater than 3-fold, elongation at break (%) than the comparative base PEEK 1 and base PEEK 2 samples.

Tensile strength was measured using ASTM D638 standard using Instron 3369. FIG. 6 shows a bar graph of mechanical properties including max tensile strength (MPa) and elongation at break (%) for comparative base PEEK 1, comparative base PEEK 2, inventive PEEK 1 formulation sample, and inventive PEEK 2 formulation sample. The inventive samples exhibited similar or slightly greater max tensile strength (101.5 MPa, 104.1 MPa, respectively) than the comparative base PEEK 1 (98.7 MPa) and base PEEK (93.6 MPa) samples. The maximum tensile strength may be 100 MPa or higher as shown in FIG. 6. The inventive samples exhibited significantly higher, greater than 2-fold or greater than 3-fold, elongation at break (%) than the comparative base PEEK 1 and base PEEK 2 samples.

Tensile Strength

Figure 8:
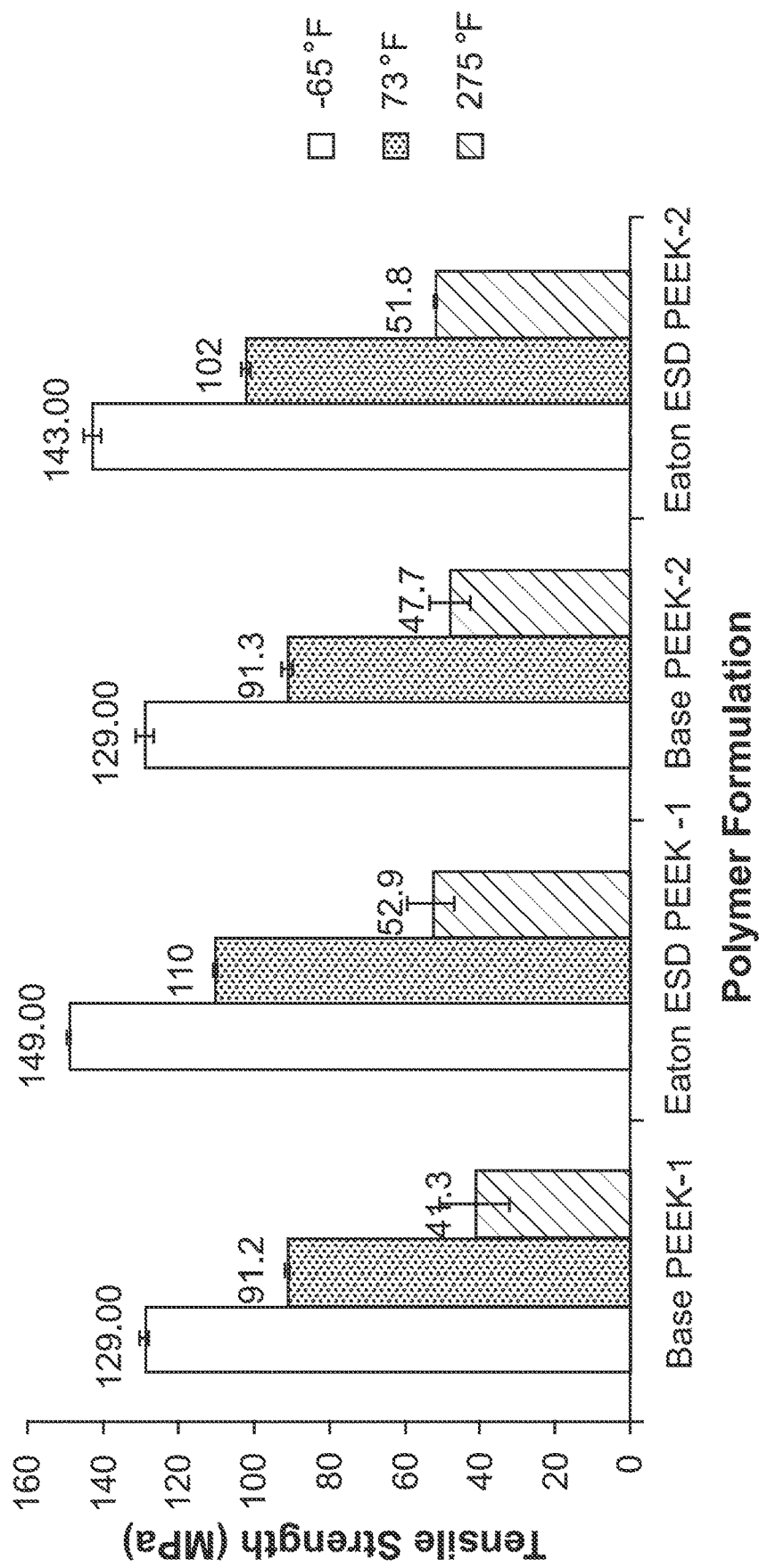
FIG. 8 shows a bar graph of the tensile strength (MPa) at three temperatures (−65° F., 73° F., 275° F.) for comparative base PEEK 1 and base PEEK 2 samples, inventive PEEK 1 composite polymer and inventive PEEK 2 composite polymer samples. Comparable tensile strength is exhibited at each of the three temperatures between comparative and inventive PEEK 1 and PEEK 2 composite polymers.

Tensile strength was measured using ASTM D638 standard using Instron 3369. FIG. 8 shows a bar graph of the tensile strength (MPa) at three temperatures (−65° F., 73° F., 275° F.) for comparative base PEEK 1 and base PEEK 2 samples, inventive PEEK 1 composite polymer and inventive PEEK 2 composite polymer samples. Comparable tensile strength is exhibited at each of the three temperatures between comparative and inventive PEEK 1 and PEEK 2 composite polymers. The tensile strength at −65° F. may be 140 MPa or higher. The tensile strength at 73° F. may be 90 MPa or higher. The tensile strength at 275° F. may be 50 MPa or higher, as shown in FIG. 8.

Tensile Modulus

Figure 9:
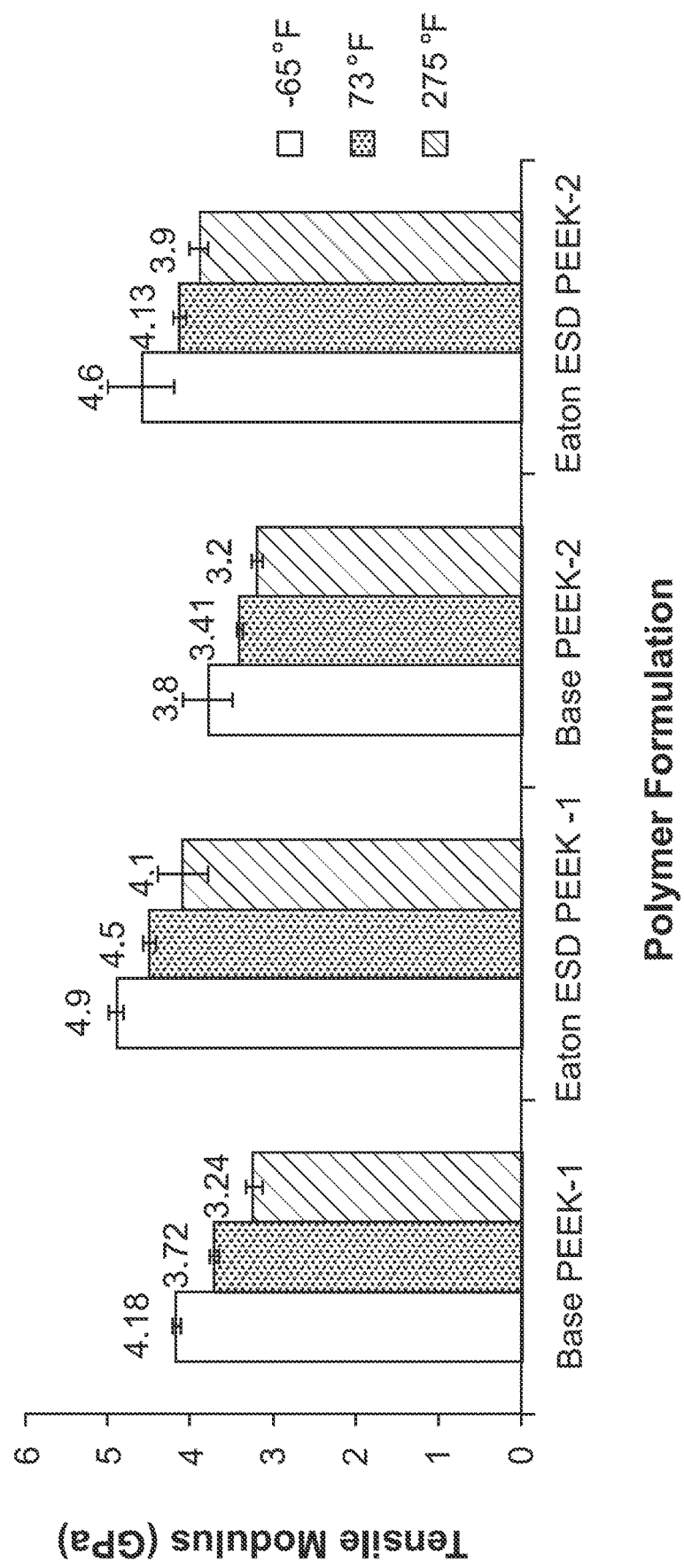
FIG. 9 shows a bar graph of the tensile modulus (GPa) at three temperatures (−65° F., 73° F., 275° F.) for comparative base PEEK 1 and base PEEK 2 samples, inventive PEEK 1 composite polymer and inventive PEEK 2 composite polymer samples. Comparable tensile modulus is exhibited at each of the three temperatures between comparative and inventive PEEK 1 and PEEK 2 composite polymers.
Figure 10:
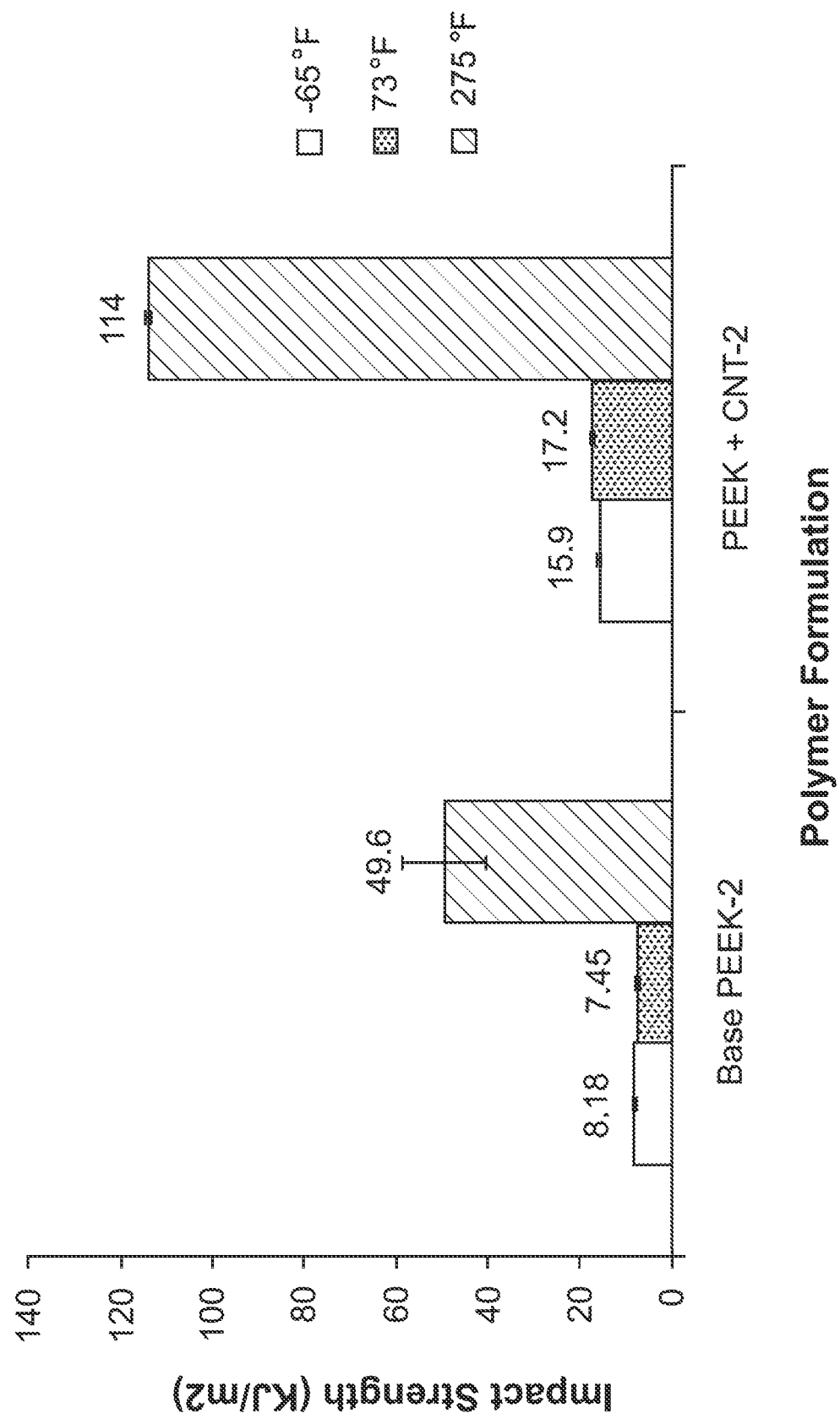
FIG. 10 shows a bar graph of impact strength (Izod, notched) at three temperatures −65° F., 73° F., and 275° F. for comparative base PEEK 2 and inventive PEEK 2+CNT-2 samples. The inventive samples exhibited significantly improved impact strength of at least about 2-fold or more of comparative samples at each of the three temperatures.

Tensile modulus was measured using ASTM D638 standard using Instron 3369. FIG. 9 shows a bar graph of the tensile modulus (GPa) at three temperatures (−65° F., 73° F., 275° F.) for comparative base PEEK 1 and base PEEK 2 samples, inventive PEEK 1 composite polymer and inventive PEEK 2 composite polymer samples. Comparable tensile modulus is exhibited at each of the three temperatures between comparative and inventive PEEK 1 and PEEK 2 composite polymers. The tensile modulus at −65° F. may be 4.5 GPa or higher. The tensile modulus at 73° F. may be 4.0 GPa or higher. The tensile modulus at 275° F. may be 3.5 GPa or higher, as shown in FIG. 9.

Impact Strength-Coupons

Figure 11:
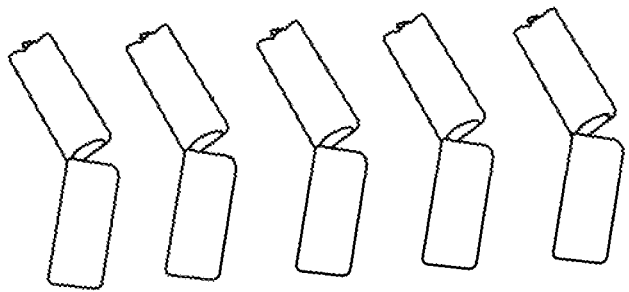
FIG. 11 shows a photograph of comparative base PEEK 2 samples where the samples broke or hinged at high temperature at 275° F. in impact strength test (Izod, notched).

Notched impact strength was measured using Ceast 9000 and ASTM D266. FIG. shows a bar graph of impact strength (Izod, notched) at three temperatures −65° F., 73° F., and 275° F. for comparative base PEEK 2 and inventive PEEK 2+CNT-2 samples. The inventive samples exhibited significantly improved impact strength of at least about 2-fold or more of comparative base PEEK samples at each of the three temperatures. Base PEEK sample partially broke or hinged at the high temperature. FIG. 11 is a photograph of comparative base PEEK 2 samples where the samples broke or hinged at high temperature at 275° F. in impact strength test (Izod, notched). The impact strength (Izod, notched) at −65° F. may be 15 KJ/m2 or higher. The impact strength (Izod, notched) at 73° F. may be 16 KJ/m2 or higher. The impact strength (Izod, notched) at 275° F. may be 100 KJ/m2 or higher.

Impact Test-Tube Level

Figure 12B:
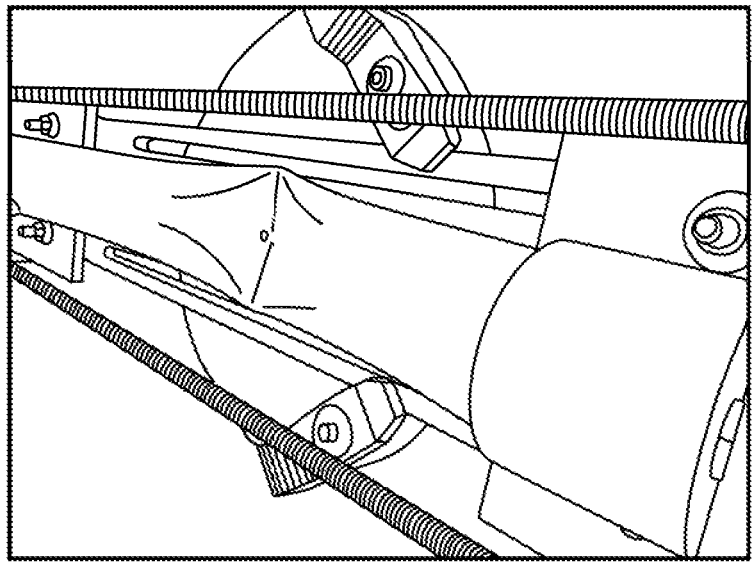
FIG. 12B shows a photograph of inventive PEEK 2 composite polymer tubing sample having 2" OD and 0.05" wall thickness post impact test. The tubing sample survived 35 J and 50 J impact, finally failing at 65 J. Post impact test, the tubing sample was subjected to proof and burst pressures. Similar to inventive PEEK 1 composite polymer sample tubing, the inventive PEEK 2 composite polymer sample tubing burst ~410 psi, and did not fail at point of impact.
Figure 12A:
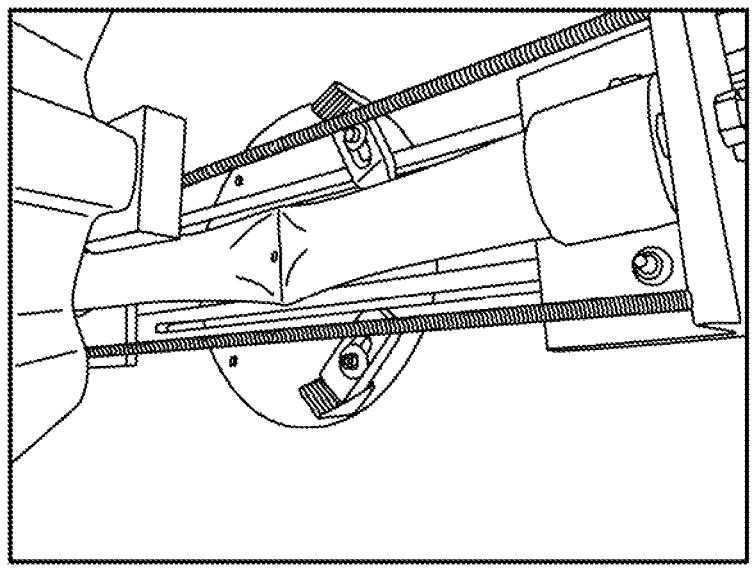
FIG. 12A shows a photograph of inventive PEEK 1 composite polymer tubing sample having 2" OD and 0.05" wall thickness post impact test. The tubing sample showed no sign of failure after 35 J impact. Post impact test, the tubing sample was subjected to proof and burst pressures. The tubing burst ~410 psi, and did not fail at point of impact.

Sample tubing of 2 inch outer diameter and 0.05 inch wall thickness was prepared from inventive PEEK 1 (including Victrex PEEK) composite polymer material and inventive PEEK 2 (including Evonik PEEK) composite polymer material. Impact strength was determined by ASTM D 256, Izod, notched, impact and measured using Ceast 9000. Photographs post impact test of inventive PEEK 1 and inventive PEEK 2 composite polymer tubing samples are shown in FIGS. 12A and 12B, respectively. Both inventive PEEK 1 and inventive PEEK 2 composite polymer tubes showed no sign of failure after 35 J impact. Inventive PEEK 2 composite polymer sample tube survived 35 J and 50 J impact finally failing at 65 J impact. Post impact test, tubes were subjected to proof and burst pressures. Both sets of tubes burst 410 PSI, but they did not fail at the point of impact.

Tensile Fatigue

Figure 13:
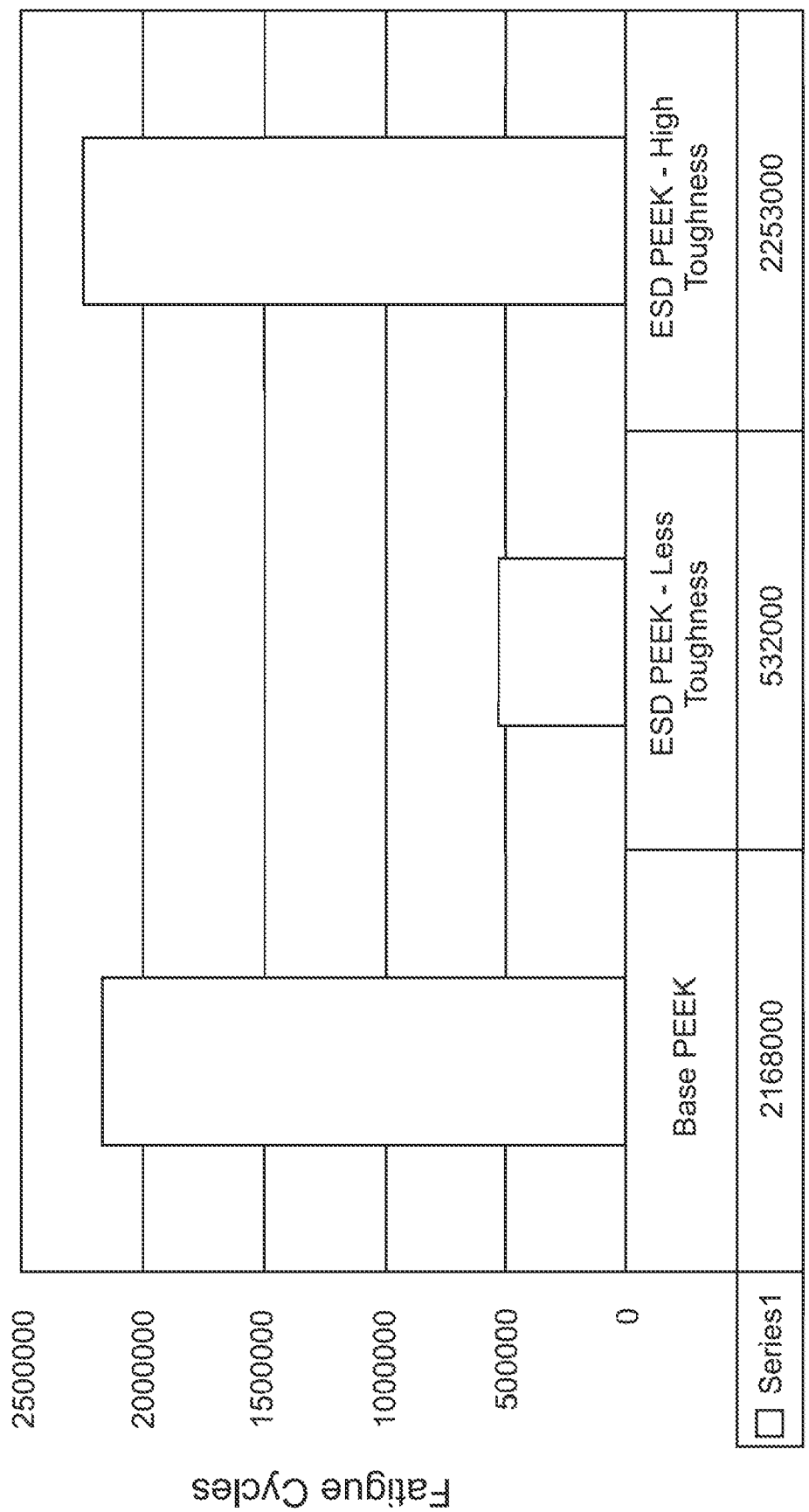
FIG. 13 shows a bar graph of tensile fatigue showing fatigue cycles at room temperature, 5 Hz, 73 MPa for a comparative base PEEK, ESD PEEK-less toughness, and an ESD PEEK with high toughness according to the disclosure exhibiting greater than 2250000 fatigue cycles.

Tensile fatigue testing was performed at room temperature, 5 Hz, and 73 MPa for comparative base PEEK material sample, ESD PEEK composite polymer sample with less toughness, and ESD PEEK composite polymer with high toughness. The ESD PEEK composite polymer with high toughness exhibited comparable tensile fatigue compared to the comparative base PEEK sample as shown in FIG. 13. The conductive composite polymer may exhibit tensile fatigue at room temperature, 5 Hz, 73 MPa, at 2,200,000 or higher fatigue cycles.

The invention claimed is:

1. A solid polymer conductive composite material, prepared from a composition comprising
    90 wt % to 99 wt % of a polyether ether ketone (PEEK) polymer;
    0.25 wt % to 5 wt % of a conductive filler;
    0.25 wt % to 5 wt % of a dispersing and processing additive, wherein the dispersing and processing additive is selected from the group consisting of polyhedral oligomeric silsesquioxanes (POSS), silanes, and silanol-POSS; and
    0.05 wt % to 3 wt % of a dielectric filler.

2. The solid polymer conductive composite material according to claim 1, comprising from 0.1 wt % to 2 wt % of the dielectric filler.

3. The solid polymer conductive composite material according to claim 2, wherein the dielectric filler is selected from the group consisting of nano alumina, nano silica, fumed alumina, fumed silica, ZnO, boron nitride nanotubes, boron nitride platelets, boron nitride nanoflakes, and $TiO_2$.

4. The solid polymer conductive composite material according to claim 2, comprising from about 0.25 wt % to about 2 wt % of the dielectric filler.

5. The solid polymer conductive composite material according to claim 1, wherein the PEEK polymer is a medium to high melt viscosity PEEK polymer of between 300 Pa·s and 500 Pa·s under ISO 11443.

6. The solid polymer conductive composite material according to claim 1, wherein the conductive filler is selected from the group consisting of carbon nanotubes, graphene, graphene oxide, carbon nanofibers, and carbon nanostructures.

7. The solid polymer conductive composite material according to claim 1, wherein the POSS is selected from the group consisting of OctaIsobutyl POSS, TriSilanolPhenyl POSS, and TriSilanolIsobutyl POSS.

8. The solid polymer conductive composite material according to claim 1, comprising from about 95 wt % to about 99 wt % of the polyether ether ketone (PEEK) base polymer.

9. The solid polymer conductive composite material according to claim 1, comprising from about 0.5 wt % to about 3 wt % of the conductive filler, wherein the conductive filler is an electrically conductive filler.

10. The solid polymer conductive composite material according to claim 1, comprising from about 0.5 wt % to about 3 wt % of the dispersing and processing additive.

11. The solid polymer conductive composite material according to claim 1, exhibiting one or more properties selected from the group consisting of
    tensile strength at room temperature (73° F.) of at least 80 MPa;
    elongation at break of at least 20%;
    electrical resistance between $10^5 \Omega$ and $10^8 \Omega$;
    maximum tensile strength of at least 95 MPa or greater;
    modulus of toughness of at least 15 MPa or greater; and
    impact strength, Izod, notched, of at least 60 KJ/m$^2$ or greater.

12. A non-metallic fuel conveyance system part for an aircraft, prepared from the solid polymer conductive composite material according to claim 1.

13. The part according to claim 12, selected from the group consisting of a fuel tube, hose, coupling, clamp, ducting, reducer, flange, ferrule, bracket, and housing.

14. A non-metallic fuel tube comprising at least one layer prepared from the solid polymer conductive composite material according to claim 1.

15. The fuel tube according to claim 14, wherein the polyaryl ether ketone (PAEK) polymer is a medium to high melt viscosity PEEK polymer of between 300 Pa·s and 500 Pa·s under ISO 11443.

16. The fuel tube according to claim 14, wherein the fuel tube exhibits
    electrical resistance between 100 KΩ and 100MΩ per 15 inches;
    maximum operating pressure of at least a 120 psi;
    continuous operating temperature of from −65° F. or below to at least 275° F.;
    excursion operating temperature of at least 325° F.; and
    compliance with RTCA DO-160 environmental standards.

17. The solid polymer conductive composite material according to claim 1, prepared from a composition comprising
    95-98.5 wt % of the PEEK polymer;
    0.5-3.0 wt % of the conductive filler;
    0.25-2 wt % of the dielectric filler; and
    0.5-3.0 wt % of the dispersing and processing additive.

18. The solid polymer conductive composite material according to claim 1, wherein the total amount of combined fillers does not exceed 5 wt %.

* * * * *